United States Patent Office 2,978,459
Patented Apr. 4, 1961

2,978,459
KETALS OF (3-INDOLYL)-AMINOALKANONES

Jacob Szmuszkovicz, Portage Township, Kalamazoo County, and William C. Anthony, Kalamazoo, Mich., assignors to The Upjohn Company, Kalamazoo, Mich., a corporation of Delaware
No Drawing. Filed Aug. 5, 1959, Ser. No. 831,698
18 Claims. (Cl. 260—319)

This invention relates to novel derivatives of indole and is more particularly concerned with ketals of (3-indolyl)-amino-alkanones, the acid addition salts thereof, and a process for their preparation.

The novel compounds of the invention can be represented, for the most part, by the following general formula:

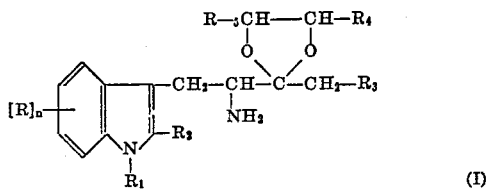

(I)

wherein R is selected from the class consisting of hydroxy, halogen, lower-alkyl, lower-aralkyl, lower-alkoxy, and lower-aralkoxy, $n$ is an integer from zero to 4, inclusive, $R_1$ and $R_2$ are selected from the class consisting of hydrogen, lower-alkyl and lower-aralkyl, $R_3$ and $R_4$ are selected from the class consisting of hydrogen and lower-alkyl, and $R_5$ is selected from the class consisting of hydrogen, lower-alkyl, and methylol.

The compounds of the invention having the Formula I above can exist in free base form or in the form of acid addition salts. It is to be understood that both the free base form and the acid addition salts fall within the scope of the present invention.

The term "lower-alkyl" as used throughout the specification and claims means an alkyl radical containing from 1 to 6 carbon atoms, inclusive, such as methyl, ethyl, propyl, butyl, amyl, hexyl, and isomeric forms thereof. The term "lower-aralkyl" means an aralkyl radical containing from 7 to 13 carbon atoms inclusive, such as benzyl, phenethyl, naphthylmethyl, benzhydryl, and the like. The term "lower-alkoxy" means an alkoxy radical containing from 1 to 6 carbon atoms, inclusive, such as methoxy, ethoxy, propoxy, butoxy, amyloxy, hexyloxy, and isomeric forms thereof. The term "lower-aralkoxy" means an aralkoxy radical containing from 7 to 13 carbon atoms, inclusive, such as benzyloxy, phenethyloxy, naphthylmethoxy, benzhydryloxy, and the like.

The novel compounds of the invention have been found to possess valuable pharmacological activity. Illustratively, the compounds of the invention exhibit anticonvulsant activity. Further the compounds of the invention are useful, in accordance with U.S. Patents 1,915,334 and 2,075,359, in forming amine fluosilicate mothproofing agents and, in accordance with U.S. Patents 2,425,320 and 2,606,155, in forming amine thiocyanate-formaldehyde condensation products for use as pickling inhibitors.

The novel compounds of the invention having the Formula I above can be prepared by a process which involves the following steps:

(a) Treating a tryptophan having the formula:

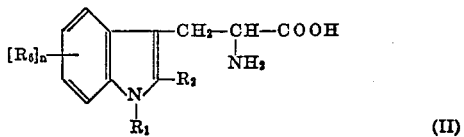

(II)

wherein $R_1$, $R_2$, and $n$ have the significance hereinbefore defined, and $R_6$ is selected from the class consisting of halogen, lower-alkyl, lower-aralkyl, lower-alkoxy, and lower-aralkoxy, with an acid anhydride having the formula $(R_3CH_2CO)_2O$ wherein $R_3$ has the significance hereinbefore defined, in the presence of a tertiary amine, to give a compound having the formula:

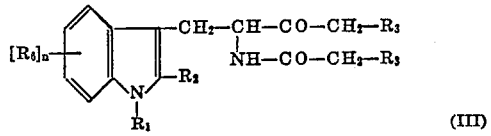

(III)

wherein $R_1$, $R_2$, $R_3$, $R_6$ and $n$ have the significance hereinbefore defined. Tertiary amines which can be used in the above process include pyridine, quinoline, isoquinoline, N-alkylpiperidines such as N-methylpiperidine, N-ethylpiperidine, and the like, trialkylamines such as triethylamine, tripropylamine, and the like, and N,N-dialkylanilines such as N,N-dimethylaniline, N,N-diethylaniline, and the like. The preferred amine is pyridine. The above reaction is an application of the well-known Dakin-West reaction [see Dakin and West, J. Biol. Chem., 78, 91 (1928)]. In its application to step (a) of the present process the reaction is carried out advantageously using the procedure described by Ghosh and Dutta, J. Ind. Chem. Soc., 33, 296 (1956) for the preparation of 3-acetamido-4-(3-inodlyl)-2-butanone (i.e., III; $n$=zero; $R_1$, $R_2$, and $R_3$=H) from tryptophan and acetic anhydride. Thus, the mixture of a tryptophan having the Formula II above and acid anhydride is allowed to react in the presence of the tertiary amine, advantageously at elevated temperature and preferably at a temperature of the order of 100° C. The reaction time varies according to the temperature at which the reaction is carried out but is preferably of the order of several hours when the reaction temperature is about 100° C. The proportion of acid anhydride to tryptophan having the Formula II above is at least stoichiometric (i.e., 2 moles of acid anhydride per mole of tryptophan) and advantageously the acid anhydride is present in excess of the stoichiometric proportion. Preferably the excess of acid anhydride is of the order of 2 to 4 times the stoichiometric proportion. The desired compound having the Formula III can be isolated from the reaction mixture using conventional methods. Advantageously the Compound III is isolated by subjecting the reaction mixture to steam distillation and recovering the Compound III from the residue. The compound so isolated can be purified, if desired, for example, by recrystallization.

(b) Subjecting the compound having the Formula III, prepared as described above, to ketalization using a glycol having the formula

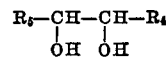

wherein $R_4$ and $R_5$ have the significance hereinbefore defined, to obtain a ketal having the formula:

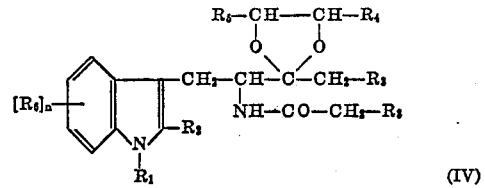

(IV)

wherein $R_1$, $R_2$, $R_3$, $R_4$, $R_5$, $R_6$, and $n$ have the significance hereinbefore defined. The ketalization is carried out in a convenient manner by heating the reactants together under reflux in the presence of an inert solvent and an acid such as p-toluenesulfonic acid, sulfuric acid, and the like. Advantageously the solvent is one which will form an azeotropic mixture with the water liberated in the course of the reaction so that under reflux conditions and using an azeotropic separator the liberated water can be removed constantly from the reaction mixture. Suitable solvents which can be used for this purpose include benzene, toluene, xylene, and the like. Advantageously, the glycol is present in an amount at least equimolar with respect to the ketone having the Formula III above. Preferably, the glycol is present in excess, such as about 6 to 12 moles of glycol per mole of ketone. Preferably, the acid employed in the reaction medium is present in catalytic amount, i.e., in an amount within the range of about 0.01 to about 0.10 mole per mole of ketone. The desired compound having the Formula IV above can be isolated from the reaction mixture using conventional procedures, for example, by extraction in a suitable solvent, and can be purified if desired, for example, by recrystallization.

(c) Hydrolyzing the compound having the Formula IV, prepared as described above, to give the desired compound having the Formula I wherein R represents halogen, lower-alkyl, lower aralkyl, lower-alkoxy or lower-aralkoxy. The hydrolysis can be carried out using processes which are well-known in the art for the conversion of acylamino radicals to amino radicals. For example, the compound having the Formula IV can be heated under reflux with a solution of an alkali metal hydroxide, and the like, in a mixture of water and a glycol such as ethylene glycol, propylene glycol, and the like. The desired compound can be isolated from the reaction mixture using conventional procedures, for example, by solvent extraction, and can be purified, for example, by recrystallization.

(d) In the case where the group $R_6$ in the ketal of Formula IV above represents alkoxy or aralkoxy and it is desired to prepare a compound of Formula I wherein R represents an hydroxy group, subjecting the compound having the Formula IV, after hydrolysis according to step (c) above, to dealkylation. When the group $R_6$ in the compound of Formula IV is alkoxy the dealkylation can be effected with aluminum chloride using the procedure of Asero et al. [Ann. 576, 69, (1952)]. Where the group $R_6$ in the Compound IV is aralkoxy, the dealkylation can be carried out by hydrogenolysis in the presence of a palladium-on-charcoal catalyst as disclosed in U.S. Patent 2,708,197.

The compounds having the Formula II above, which are employed as starting materials in step (a) of the process of the invention, can be prepared by methods which are well-known in the art. Thus the compounds having the Formula II can be prepared from the appropriately substituted 3-(dialkylaminomethyl)indoles using the procedure described in U.S. Patent 2,557,041 for the preparation of tryptophan from 3-(dimethylaminomethyl)indole. The appropriately substituted 3-(dialkylaminomethyl)indoles can themselves be prepared by reacting the appropriately substituted indole (which, however, is unsubstituted at the 3-position) with a dialkylamine in the presence of formaldehyde. For example, the procedures disclosed by Ek et al., J. Am. Chem. Soc. 76, 5579 (1954), Rydon et al., J. Chem. Soc. 2462, 1951, and Bell et al., J. Org. Chem. 13, 547 (1948), who show the preparation of 5-benzyloxy-3-(dimethylaminomethyl)indole, 5-ethoxy-3-(dimethylaminomethyl)indole, and 5-methoxy-3-(dimethylaminomethyl)-indole, respectively can be employed. The appropriately substituted indole starting materials can be prepared by methods which are well-known in the art. Such methods are summarized in "Chemistry of Carbon Compounds," edited by E. H. Rodd, vol. IV$^A$, pages 71 to 77, Elsevier, New York, 1957. The following are representative compounds having the Formula II which can be prepared by the above-described processes and which are suitable for use as starting compounds in the process of the invention: tryptophan, 4-chlorotryptophan, 1-methyltryptophan, 2-methyltryptophan, 4-methyltryptophan, 5-methyltryptophan, 6-methyltryptophan, 4,6-dimethyltryptophan, 6-amyltryptophan, 4-methoxytryptophan, 6-methoxytryptophan, 4-methoxy-1-methyltryptophan, 5,6-dimethoxytryptophan, 5-fluorotryptophan, 1-benzyltryptophan, 5-benzyloxytryptophan, 6-benzyloxytryptophan, 1-hexyl-6-benzyloxytryptophan, 1,2-dibenzyl-5,6-diethoxytryptophan, 2-methyl-5,7-dichlorotryptophan, and 2-t-butyltryptophan.

The glycols having the formula

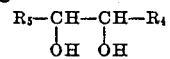

which are employed as starting materials in step (b) of the process of the invention, are for the most part known compounds. They can be prepared by alkaline hydrolysis of the corresponding halides $R_5$—CHX—CHX—$R_4$ wherein X represents chlorine or bromine, or by oxidation of the corresponding olefins $R_5$—CH=CH—$R_4$. Glycols which are suitable for use in step (b) of the process of the invention include: ethylene glycol, 1,2-propanediol, 1,2-butanediol, 2,3-butanediol, 1,2-hexanediol, 2,3-hexanediol, 1,2-octanediol, 2,7-dimethyl-4,5-octanediol, glycerol, and the like.

The acid addition salts of the invention comprise the salts of free base compounds having the Formula I above with pharmacologically acceptable acids. Such acids include hydrochloric, hydrobromic, hydriodic, sulfuric, phosphoric, nitric, acetic, benzoic, salicylic, glycolic, succinic, nicotinic, ascorbic, tartaric, maleic, malic, lactic, cyclohexylsulfamic, alginic acids and the like. The acid addition salts of the invention can be prepared in a convenient manner by reacting stoichiometric proportions of the acid and a compound having the Formula I in the presence of a suitable solvent such as water, acetone, dioxane, ethyl acetate, methanol, ethanol, isopropanol, ether, and the like.

When used in therapy the novel compounds of the invention in free base form or in the form of pharmacologically acceptable acid addition salts, can be combined with solid or liquid pharmaceutical carriers and formulated in the form of tablets, powder packets or capsules, using starch and like excipients, or dissolved or suspended in suitable solvents or vehicles, for oral or parenteral administration.

The following examples are illustrative of the process and products of the present invention, but are not to be construed as limiting.

*Example 1.—The ethylene glycol ketal of 3-amino-4-(3-indolyl)-2-butanone*

(a) *3-acetamido-4-(3-indolyl)-2-butanone.*—A solution of 1800 ml. (19.1 moles) of acetic anhydride and 1280 ml. of pyridine was added to 480 g. (2.35 moles) of tryptophan and the mixture was heated on the steam bath with stirring for 5.5 hours. The resulting solution was treated with 4 l. of water and the mixture so obtained was subjected to steam distillation until 8 l. of distillate had been obtained. The pot residue was allowed to stand overnight before isolating the oily solid by filtration. The material was washed on the filter with water and recrystallized from methanol. The first crop of crystals weighed 227.1 g. and had a melting point of 134 to 135.5° C. The second crop weighed 64.2 g. and had a melting point of 133 to 135° C. A further 58.9 g. of the same compound having a melting point of 134 to 136° C. was recovered from the filtrate remaining after working up the pot residue, by extracting the filtrate with 5 portions, totalling 3250 ml., of ethyl acetate, washing the extracts successively with water, 5% aqueous sodium bicarbonate solution, and water, drying over anhydrous sodium sulfate, evaporating the dried, filtered solution to dryness, and recrystallizing the residue from methanol. There was thus obtained a total of 350.2 g. of 3-acetamido-4-(3-indolyl)-2-butanone, a sample of which was recrystallized from a mixture of methanol and water for analytical purposes and was found to have a melting point of 136.5 to 137.5° C.

The ultraviolet absorption spectrum of the compound (in solution in ethanol) exhibited maxima at 221, 275, 281.5, and 290 millimicrons. The infrared absorption spectrum of the compound (mineral oil mull) exhibited maxima at 1548, 1660, 1708, 3240, and 3320 reciprocal centimeters.

*Analysis.*—Calcd. for $C_{14}H_{16}N_2O_2$: C, 68.83; H, 6.60; N, 11.47. Found: C, 6850; H, 6.67; N, 11.40.

(b) *The ethylene glycol ketal of 3-acetamido-4-(3-indolyl)-2-butanone.*—A mixture of 12.2 g. (0.05 mole) of 3 - acetamido-4-(3-indolyl)-2-butanone, 31 g. (0.5 mole) of ethylene glycol, 250 ml. of benzene and 0.5 g. of p-toluenesulfonic acid monohydrate was refluxed with stirring using an azeotropic separator until no more water distilled from the mixture. The resulting mixture was cooled in ice and 100 ml. of water and 100 ml. of chloroform were added. The aqueous layer was separated and extracted with a further three portions of chloroform. The chloroform extracts were combined, washed successively with saturated aqueous sodium bicarbonate solution, water, and saturated aqueous sodium chloride solution, and dried over anhydrous sodium sulfate. The dried solution was filtered, the filtrate was evaporated to dryness and the residue was dried in vacuo. There was thus obtained 12.5 g. of the ethylene glycol ketal of 3-acetamido-4-(3-indolyl)-2-butanone in the form of a powder.

(c) *The ethylene glycol ketal of 3-amino-4-(3-indolyl)-2-butanone.*—To 326 g. of potassium hydroxide and 81.5 ml. of water in a stainless steel flask were added 100 g. (0.347 mole) of the ethylene glycol ketal of 3-acetamido-4-(3-indolyl)-2-butanone and 815 ml. of ethylene glycol. The mixture was heated under reflux for 68 hours before being cooled to room temperature. The cooled solution was treated with 500 ml. of water and the mixture was extracted six times with a total of 1500 ml. of chloroform. The combined chloroform extracts were washed twice with water, three times with saturated aqueous sodium chloride solution, and dried over anhydrous sodium sulfate. The dried solution was filtered and the filtrate was evaporated to dryness. The residue was recrystallized twice from benzene. There was thus obtained 56.66 g. (including second crops) of the ethylene glycol ketal of 3-amino-4-(3-indolyl)-2-butanone in the form of a crystalline solid having a melting point of 134 to 136° C.

The ultraviolet absorption spectrum of the compound (in solution in ethanol) exhibited maxima at 275, 282, and 290 millimicrons. The infrared absorption spectrum of the compound (mineral oil mull) exhibited maxima at 1490, 1585, 1600, 1615, 1645, 3200, and 3280 reciprocal centimeters.

*Analysis.*—Calcd. for $C_{14}H_{18}N_2O_2$: C, 68.27; H, 7.37; N, 11.37. Found: C, 68.02; H, 7.29; N, 10.96.

*Example 2.*—The ethylene glycol ketal of 2-amino-1-(3-indolyl)-3-pentanone (a) *2 - propionamido - 1 - (3 - indolyl) - 3 - pentanone.*—A mixture of 107 g. (0.525 mole) of tryptophan, 400 ml. (3.11 moles) of propionic anhydride, and 285 ml. of pyridine was stirred and heated on a steam bath for 5.5 hr. The resulting mixture was allowed to stand for 2 days at room temperature before being treated with 890 ml. of water with external cooling to maintain the temperature at 30 to 40° C. The mixture was then subjected to steam distillation until approximately 2 l. of distillate had been collected. The pot residue was extracted with two portions, each of 250 ml., of ethyl acetate. The combined extracts were washed successively with three portions of water, aqueous sodium bicarbonate solution, and saturated aqueous sodium chloride solution before being dried over anhydrous sodium sulfate. The dried solution was filtered and the filtrate was evaporated to dryness. The oily residue was dissolved in a mixture of 100 ml. of benzene and 20 ml. of acetone and subjected to chromatography on a column of 4380 g. of Florisil (magnesium silicate). The column was eluted successively with 38 l. of a mixture of 5 parts acetone and 95 parts benzene, 6 l. of a mixture of 10 parts acetone and 90 parts benzene, and 4 l. of a mixture of 20 parts acetone and 80 parts benzene. The combined eluate was evaporated to dryness and the residue was recrystallized from ether. There was thus obtained 22.9 g. of 2-propionamido-1-(3-indolyl)-3-pentanone in the form of a crystalline solid which, after two further recrystallizations from ether, had a melting point of 104.5 to 106° C.

The ultraviolet absorption spectrum of the compound (in solution in ethanol) exhibited maxima at 220, 274, 281, and 288.5 millimicrons. The infrared absorption spectrum of the compound (mineral oil mull) exhibited maxima at 752, 763, 1500, 1512 (sh), 1580 (sh), 1620 (sh), 1645, 1715, 3200 (sh), 3290, and 3410 reciprocal centimeters.

*Analysis.*—Calcd. for $C_{16}H_{20}N_2O_2$: C, 70.56; H, 7.40; N, 10.29. Found: C, 70.53; H, 7.36; N, 10.00.

(b) *The ethylene glycol ketal of 2-propionamido-1-(3-indolyl)-3-pentanone.*—A mixture of 22.9 g. (0.084 mole) of 2-propionamido-1-(3-indolyl)-2-pentanone, 52.8 g. (0.85 mole) of ethylene glycol, 0.84 g. of p-toluenesulfonic acid monohydrate, and 420 ml. of benzene was heated under reflux with stirring using an azeotropic separator until no more water distilled from the mixture. The resulting solution of the ethylene glycol ketal of 2-propionamido-1-(3-indolyl)-3-pentanone was allowed to cool and was then used in the reaction described under (c) below.

(c) *The ethylene glycol ketal of 2-amino-1-(3-indolyl)-3-pentanone.*—The solution obtained as described in (b) above was treated with 3 g. of potassium hydroxide and the mixture was evaporated to dryness in vacuo. The residue was transferred to a stainless steel flask and treated with 160 ml. of ethylene glycol, 80 g. of potassium hydroxide, and 20 ml. of water. The resulting mixture was heated under reflux with stirring in an atmosphere of nitrogen for 91 hr. The cooled mixture was treated with 100 ml. of water and the mixture was extracted with four portions, each of 50 ml., of chloroform. The combined chloroform extracts were washed with water, then with saturated aqueous sodium chloride solution, and dried over anhydrous sodium sulfate. The dried solution was filtered and the filtrate was evaporated to dryness. The residue was dissolved in 200 ml. of ether, the solution was filtered, and the filtrate was evaporated to one-half volume and then allowed to crystallize. The solid which separated was isolated by filtration and dried to give 9.16 g. of material having a melting point of 133.5 to 135° C. This material was recrystallized from benzene. There was thus obtained the ethylene glycol ketal of 2-amino-1-(3-indolyl)-3-pentanone in the form of a crystalline solid having a melting point of 135 to 136° C.

The ultraviolet absorption spectrum of the compound (in solution in ethanol) exhibited maxima at 221, 271, 281, and 290 millimicrons. The infrared absorption spectrum of the compound (mineral oil mull) exhibited maxima at 683, 758, 805, 832, 1030, 1055, 1087, 1107, 1140, 1212, 1235, 1296, 1346, 1496, 1585, 1610, 1620, 3140, 3220 (sh), and 3340 (sh), reciprocal centimeters.

*Analysis.*—Calcd. for $C_{15}H_{20}N_2O_2$: C, 69.20; H, 7.74; N, 10.76. Found: C, 69.24; H, 7.87; N, 10.96.

*Example 3.*—The ethylene glycol ketal of 3-amino-4-(5-methyl-3-indolyl)-2-butanone (a) *3-acetamido - 4 - (5-methyl - 3 - indolyl)-2-butanone.*—A mixture of 9.6 g. (0.044 mole) of 5-methyltryptophan [J. Am. Chem. Soc. 75, 1873 (1953)], 35 ml. (0.375 mole) of acetic anhydride, and 25 ml. of pyridine was heated on the steam bath with stirring for 5.5 hours. The resulting solution was treated with 100 ml. of water and the mixture was subjected to steam distillation until 200 ml. of distillate had been obtained. The pot residue was extracted with ethyl acetate and the extract was washed successively with water, aqueous sodium bicarbonate solution, and saturated aqueous sodium chloride solution before being dried over anhydrous sodium sulfate. The dried solution was filtered and the filtrate was evaporated to dryness. There was thus obtained 3-acetamido-4-(5-methyl-3-indolyl)-2-butanone in the form of an oil. The infrared absorption spectrum of the compound (mineral oil mull) exhibited maxima at 1665 and 1720 reciprocal centimeters.

(b) *The ethylene glycol ketal of 3-acetamido-4-(5-methyl-3-indolyl)-2-butanone.*—A mixture of 10 g. (0.039 mole) of 3-acetamido-4-(5-methyl-3-indolyl)-2-butanone, 22.8 ml. of ethylene glycol, 0.41 g. of p-toluenesulfonic acid monohydrate, and 205 ml. of benzene was heated under reflux with stirring using an azeotropic separator until no more water distilled from the mixture. The resulting mixture was worked up as described in Example 1, part (b) above, to obtain 10 g. of the ethylene glycol ketal of 3-acetamido-4-(5-methyl-3-indolyl)-2-butanone.

(c) *The ethylene glycol ketal of 3-amino-4-(5-methyl-3-indolyl)-2-butanone.*—To 32.6 g. of potassium hydroxide and 8 ml. of water in a stainless steel flask were added 10 g. of the ethylene glycol ketal of 3-acetamido-4-(5-methyl-3-indolyl)-2-butanone and 81 ml. of ethylene glycol. The mixture was heated under reflux with stirring for 90 hr. in an atmosphere of nitrogen. The cooled mixture was treated with 50 ml. of water and the mixture was extracted with four portions, each of 25 ml., of chloroform. The combined chloroform extracts were washed with water, then with saturated aqueous sodium chloride solution, and dried over anhydrous sodium sulfate. The dried solution was filtered and the filtrate was evaporated to dryness. The residue was dissolved in benzene and subjected to chromatography on a column of 740 g. of Florisil. The column was eluted with 1750 ml. of a mixture of 2 parts of methanol and 98 parts of benzene and the eluate was discarded. The column was then eluted with 2.5 l. of a mixture of 2.5 parts of methanol and 97.5 parts of benzene and from the eluate was recovered 1.74 g. of the desired product in an impure state. The column was then eluted successively with 1750 ml. of a mixture of 3.5 parts of methanol and 96.5 parts of benzene, and with 1250 ml. of a mixture of 4.5 parts of methanol and 95.5 parts of benzene. The combined eluates were evaporated to dryness. There was thus obtained 2.9 g. of the ethylene glycol ketal of 3-amino-4-(5-methyl-3-indolyl)-2-butanone in the form of an amorphous solid. The infrared absorption spectrum of the compound (mineral oil mull) exhibited maxima at 778, 820, 870, 1038, 1055, 1085, 1140, 1175, 1218, 1250 (sh), 1275, 1300, 1323, 1350, 1485, 1585, 1620 (sh), 3150, 3220, 3360, and 3500 (sh), reciprocal centimeters.

*Analysis.*—Calcd. for $C_{15}H_{20}N_2O_2$: N, 10.76. Found: N, 10.06.

In a similar manner, using the procedure described in (a) and (b) above but replacing 5-methyltryptophan, employed as starting material in (a), by 4-methyltryptophan [J. Am. Chem. Soc. 75, 1873 (1953)], 6-methyltryptophan (loc. cit.), 4,6-dimethyltryptophan (loc. cit.) and 2-methyltryptophan [J. Am. Chem. Soc. 77, 1257 (1957)], there are obtained 3-acetamido-4-(4-methyl-3-indolyl)-2-butanone, 3-acetamido-4-(6-methyl-3-indolyl)-2-butanone, 3-acetamido-4-(4,6-dimethyl-3-indolyl)-2-butanone, and 3-acetamido-4-(2-methyl-3-indolyl)-2-butanone, respectively. The latter compounds are then treated according to the procedure described in (c) above to obtain 3-amino-4-(4-methyl-3-indolyl)-2-butanone, 3-amino-4-(6-methyl-3-indolyl)-2-butanone, 3-amino-4-(4,6-dimethyl-3-indolyl)-2-butanone, and 3-amino-4-(2-methyl-3-indolyl)-2-butanone, respectively.

*Example 4.*—*The hydrochloride of the ethylene glycol ketal of 3-amino-4-(5-hydroxy-3-indolyl)-2-butanone*

(a) *3-acetamido-4-(5-benzyloxy-3-indolyl)-2-butanone.*—A mixture of 48 g. of (0.155 mole) of 5-benzyloxytryptophan [J. Am. Chem. Soc., 76, 5579 (1954)], 180 ml. (1.91 moles) of acetic anhydride, and 128 ml. of pyridine was heated on the steam bath with stirring for 5 hr. The resulting solution was treated with 400 ml. of water and the mixture so obtained was subjected to steam distillation until 800 ml. of distillate had been obtained. The pot residue was allowed to stand overnight before isolating the solid by filtration. The material was washed with water on the filter and then recrystallized from 250 ml. of methanol. There was thus obtained 29.67 g. of 3-acetamido-4-(5-benzyloxy-3-indolyl)-2-butanone in the form of a crystalline solid having a melting point of 159.5 to 161.5° C. A small sample of the material was recrystallized from methanol for analytical purposes to give crystals having a melting point of 163 to 164° C.

The ultraviolet absorption spectrum of the compound (in solution in ethanol) exhibited maxima at 220, 276.5, 294, and 306 millimicrons. The infrared absorption spectrum of the compound (mineral oil mull) exhibited maxima at 690, 720, 740, 755, 785, 842, 1205, 1220, 1245, 1490, 1535, 1585 1635, 1714, 3020, 3080 (sh), 3130, and 3340 reciprocal centimeters.

(b) *The ethylene glycol ketal of 3-acetamido-4-(5-benzyloxy-3-indolyl)-2-butanone.*—A mixture of 29.3 g. (0.084 mole) of 3-acetamido-4-(5-benzyloxy-3-indolyl)-2-butanone, 47 ml. of ethylene glycol, 420 ml. of benzene, and 0.84 g. of p-toluenesulfonic acid monohydrate was heated under reflux with stirring using an azeotropic separator, until no more water distilled from the mixture. The resulting mixture was cooled in ice, and 80 ml. of aqueous sodium bicarbonate solution and 150 ml. of chloroform were added. The aqueous layer was separated and extracted with a further three portions of chloroform. The chloroform extracts were combined, washed with saturated aqueous sodium bicarbonate solution, then with saturated aqueous sodium chloride solution, and dried over anhydrous sodium sulfate. The dried solution was filtered, the filtrate was evaporated to dryness and the residue was dried in vacuo. There was thus obtained 21.15 g. of the ethylene glycol ketal of 3-acetamido-4-(5-benzyloxy-3-indolyl)-2-butanone.

(c) *The ethylene glycol ketal of 3-amino-4-(5-benzyloxy-3-indolyl)-2-butanone.*—To 48.5 g. of potassium hydroxide and 12.2 ml. of water in a stainless steel flask were added 21.15 g. (0.06 mole) of the ethylene glycol ketal of 3-acetamido-4-(5-benzyloxy-3-indolyl)-2-butanone and 122 ml. of ethylene glycol. The mixture was heated under reflux for 118 hr. before being cooled to room temperature. The cooled solution was treated with 200 ml. of water and the mixture was extracted 4 times with a total of 200 ml. of chloroform, and then 8 times with a total of 400 ml. of butanol. The combined extracts were washed twice with water, twice with saturated aqueous sodium chloride solution, and dried over anhydrous sodium sulfate. The dried solution was filtered and the filtrate was evaporated to dryness. There was thus obtained 16.5 g. of the ethylene glycol ketal of 3-amino-4-(5-benzyloxy-3-indolyl)-2-butanone in the form of an oil. The ultraviolet absorption spectrum of the compound (in solution in ethanol) exhibited maxima at 216 (f), 232, 251 (f), 262 (f), 268 (f), 288 (f), 298, 312 (f), 348 (f), and 366 millimicrons.

(d) *The hydrochloride of the ethylene glycol ketal of 3-amino-4-(5-hydroxy-3-indolyl)-2-butanone.*—A mixture of 16.5 g. (0.047 mole) of the ethylene glycol ketal of 3-amino-4-(5-benzyloxy-3-indolyl)-2-butanone, 4.7 ml. of 0.1 N hydrochloric acid, 25 ml. of water, 50 ml. of ethanol and 1 g. of 10% palladium-on-charcoal catalyst was shaken for 4 hr. in the presence of hydrogen at an initial pressure of 50 p.s.i. The resulting mixture was filtered and the filtrate was evaporated to dryness. There was thus obtained the hydrochloride of the ethylene glycol ketal of 3-amino-4-(5-hydroxy-3-indolyl)-2-butanone.

*Example 5.—The glycerol ketal of 3-amino-4-(3-indolyl)-2-butanone*

(a) *The glycerol ketal of 3-acetamido-4-(3-indolyl)-2-butanone.*—A mixture of 48.8 g. (0.2 mole) of 3-acetamido-4-(3-indolyl)-2-butanone [prepared as described in Example 1, part (a)], 184 g. (2 moles) of glycerol, 1 g. of p-toluenesulfonic acid monohydrate, and 500 ml. of toluene was heated under reflux with stirring using an azeotropic separator for 5.25 hr. The reaction mixture was then cooled in ice and treated with 200 ml. of 5% aqueous sodium bicarbonate solution. The resulting mixture was extracted with ethyl acetate and the ethyl acetate extract was washed successively with two portions, each of 100 ml., of 10% aqueous sodium bicarbonate solution, five portions, each of 100 ml., of water and two portions, each of 100 ml., of saturated aqueous sodium chloride solution. The washed solution was dried over anhydrous sodium sulfate and the dried solution was filtered. The filtrate was evaporated to dryness. There was thus obtained 35.6 g. of the glycerol ketal of 3-acetamido-4-(3-indolyl)-2-butanone in the form of a yellow powder.

(b) *The glycerol ketal of 3-amino-4-(3-indolyl)-2-butanone.*—To 108 g. of potassium hydroxide and 27 ml. of water in a stainless steel flask were added 33.2 g. of the glycerol ketal of 3-acetamido-4-(3-indolyl)-2-butanone and 270 ml. of ethylene glycol. The mixture was heated under reflux for 66 hr. before being cooled to room temperature. The cooled solution was treated with 200 ml. of water and the mixture was extracted six times with a total of 500 ml. of chloroform. The combined chloroform extracts were washed twice with water, three times with saturated aqueous sodium chloride solution, and dried over anhydrous sodium sulfate. The dried solution was filtered and the filtrate was evaporated to dryness. The residue was dissolved in 200 ml. of benzene and subjected to chromatography on a column of 2300 g. of Florisil. The column was eluted with benzene containing increasing proportions of methanol. All the eluates obtained, using benzene containing less than 12.5% of methanol, were discarded. The eluates obtained using 9 l. of a mixture of 12.5 parts of methanol and 87.5 parts of benzene, 5 l. of a mixture of 20 parts of methanol and 80 parts of benzene, and 4 l. of a mixture of 30 parts of methanol and 70 parts of benzene, were combined and evaporated to dryness. There was thus obtained 11.13 g. of a solid material which was dissolved in methanol. The methanol solution was filtered and the filtrate was evaporated to dryness. There was thus obtained the glycerol ketal of 3-amino-4-(3-indolyl)-2-butanone in the form of a solid.

The ultraviolet absorption spectrum of the compound (in solution in ethanol) exhibited maxima at 222, 275 (f), 282.5, 290, and 332 (pl) millimicrons. The infrared absorption spectrum of the compound (mineral oil mull) exhibited maxima at 1015–1120, 1150, 1175, 1235, 1250, 1495, 1580, 1620, 1660 (sh), 2660 (sh), 2720 (sh), 3160–3320, 3380, 3420 (sh), and 3520 (sh) reciprocal centimeters.

*Example 6.—The acetate of the 1,2-dimethylethylene glycol ketal of 3-amino-4-(3-indolyl)-2-butanone*

(a) *The 1,2-dimethylethylene glycol ketal of 3-acetamido-4-(3-indolyl)-2-butanone.*—A mixture of 12.2 g. (0.05 mole) of 3-acetamido-4-(3-indolyl)-2-butanone [prepared as described in Example 1, part (a)], 45 g. (0.5 mole) of 2,3-butanediol (Beilsteins Handbuch der Organischen Chemie, vol. 1, p. 479, fourth edition, 1918), 250 ml. of benzene, and 0.5 g. of p-toluene-sulfonic acid monohydrate was heated under reflux with stirring using an azeotropic separator until no more water came over. The reaction mixture was cooled in ice, and 100 ml. of water and 100 ml. of chloroform were added. The aqueous layer was separated and extracted with a further three portions of chloroform. The chloroform extracts were combined, washed with saturated aqueous sodium bicarbonate solution, then with saturated aqueous sodium chloride solution, and dried over anhydrous sodium sulfate. The dried solution was filtered, the filtrate was evaporated to dryness, and the residue was dried in vacuo. There was thus obtained 11 g. of the 1,2-dimethylethylene glycol of 3-acetamido-4-(3-indolyl)-2-butanone.

(b) *The acetate of the 1,2-dimethylethylene glycol of 3-amino-4-(3-indolyl)-2-butanone.*—A mixture of 11 g. of the 1,2-dimethylethylene glycol of 3-acetamido-4-(3-indolyl)-2-butanone, 115 ml. of ethylene glycol, 45.5 g. of potassium hydroxide, and 11.5 ml. of water was heated under reflux in a stainless steel vessel for 68 hr. An additional 10 g. of potassium hydroxide was added and the mixture was again heated under reflux, until the infrared absorption spectrum of the crude product showed no carbonyl band. The reaction mixture was cooled to room temperature and 70 ml. of water was added. The mixture was extracted thoroughly with chloroform and the chloroform extract was washed with water, and dried over anhydrous sodium sulfate. The dried solution was filtered and the filtrate was evaporated to dryness. The residue was dissolved in ether and a slight excess of glacial acetic acid was added to the solution. The solution was cooled in an ice bath and the solid which separated was isolated by filtration and recrystallized from a mixture of ethanol and benzene. There was thus obtained 1.4 g. of crystalline acetate of the 1,2-dimethylethylene glycol of 3-amino-4-(3-indolyl)-2-butanone having a melting point of 168 to 169.5° C. The ether filtrate was diluted with Skellysolve B (a mixture of hexanes) and maintained at −5° C. for several hours. The gum which separated was isolated by decantation, washed free of acetic acid with Skellysolve B, and recrystallized from a mixture of benzene and Skellysolve B. There was thus obtained a second crop (2.3 g.) of the acetate of the 1,2-dimethylethylene glycol ketal of 3-amino-4-(3-indolyl)-2-butanone in the form of a crystalline solid having a melting point of 168 to 169° C.

The ultraviolet absorption spectrum of the compound (in solution in ethanol) exhibited maxima at 220.5, 274, 281, and 298 millimicrons. The infrared absorption spectrum of the compound (mineral oil mull) exhibited maxima at 707, 723, 735, 745 (sh), 1017, 1045, 1055 (sh), 1077, 1098, 1115, 1130, 1160, 1410, 1430, 1492, 1518, 1528 (sh), 1570, 1605, 2570, 2630, 2680, 2740, and 3210 reciprocal centimeters.

*Example 7.—The ethylene glycol ketal of 2-amino-1-(3-indolyl)-5-methyl-3-hexanone*

Using the procedure described in Example 1, parts (a) and (b), but replacing acetic anhydride by isovaleric anhydride in the process of part (a), there is obtained the ethylene glycol ketal of 2-isovaleramido-1-(3-indolyl)-5-methyl-3-hexanone. The latter compound is hydrolyzed by the process described in Example 1, part (c), to give the ethylene glycol ketal of 2-amino-1-(3-indolyl)-5-methyl-3-hexanone.

*Example 8.—The ethylene glycol ketal of 2-amino-1-(3-indolyl)-3-nonanone*

Using the procedure described in Example 1, parts (a) and (b), but replacing acetic anhydride by heptanoic anhydride in the process of part (a), there is obtained the ethylenet glycol ketal of 2-heptanamido-1-(3-indolyl)-3-nonanone. The latter compound is hydrolyzed by the process described in Example 1, part (c), to give the ethylene glycol ketal of 2-amino-1-(3-indolyl)-3-nonanone.

Example 9.—The 1-hexylethylene glycol ketal of 3-amino-4-(3-indolyl)-2-butanone Using the procedure described in Example 1, part (b), but replacing ethylene glycol by 1,2-octanediol [Berichte, 66B, 591 (1933)], there is obtained the 1-hexylene glycol ketal of 3-acetamido-4-(3-indolyl)-2-butanone. The latter compound is hydrolyzed by the process described in Example 1, part (c), to obtain the 1-hexylethylene glycol ketal of 3-amino-4-(3-indolyl)-2-butanone.

Example 10.—The 1,2-diisobutylethylene glycol ketal of 3-amino-4-(3-indolyl)-2-butanone Using the procedure described in Example 1, part (b), but replacing ethylene glycol by 2,7-dimethyl-4,5-octanediol (Beilsteins Handbuch der Organischen Chemie, vol. 1, p. 495, fourth edition, 1918), there is obtained the 1,2-diisobutylethylene glycol ketal of 3-acetamido-4-(3-indolyl)-2-butanone. The latter compound is hydrolyzed by the process described in Example 1, part (c), to obtain the 1,2-diisobutylethylene glycol ketal of 3-amino-4-(3-indolyl)-2-butanone.

Example 11.—The ethylene glycol ketal of 3-amino-4-(4-chloro-3-indolyl)-2-butanone Using the procedure described in Example 1, parts (a) and (b), but replacing tryptophan by 4-chlorotryptophan [Helv. Chim. Acta, 38, 468 (1955)] in the process of part (a), there is obtained the ethylene glycol ketal of 3-acetamido-4-(4-chloro-3-indolyl)-2-butanone. The latter compound is hydrolyzed using the procedure described in Example 1, part (c), to obtain the ethylene glycol ketal of 3-amino-4-(4-chloro-3-indolyl)-2-butanone.

In similar manner but replacing 4-chlorotryptophan by 5-fluorotryptophan [J. Am. Chem. Soc., 72, 2296 (1950)], there are obtained the ethylene glycol ketals of 3-acetamido-4-(5-fluoro-3-indolyl)-2-butanone and 3-amino-4-(5-fluoro-3-indolyl)-2-butanone.

Example 12.—The ethylene glycol ketal of 3-amino-4-(1-benzyl-3-indolyl)-2-butanone Using the procedure described in Example 1, parts (a) and (b), but replacing tryptophan by 1-benzyltryptophan [Biochem. J., 48, 591 (1951)], there is obtained the ethylene glycol ketal of 3-acetamido-4-(1-benzyl-3-indolyl)-2-butanone. The latter compound is hydrolyzed using the process described in Example 1, part (c), to obtain the ethylene glycol ketal of 3-amino-4-(1-benzyl-3-indolyl)-2-butanone.

Example 13.—The ethylene glycol ketal of 3-amino-4-(4-methoxy-3-indolyl)-2-butanone Using the procedure described in Example 1, parts (a) and (b), but replacing tryptophan by 4-methoxytryptophan (J. Chem. Soc., 1952, 3912), there is obtained the ethylene glycol ketal of 3-acetamido-4-(4-methoxy-3-indolyl)-2-butanone. The latter compound is then hydrolyzed using the procedure described in Example 1, part (c), to obtain the ethylene glycol ketal of 3-amino-4-(4-methoxy-3-indolyl)-2-butanone.

In similar manner, but replacing tryptophan by 6-methoxy-tryptophan (U.S. Patent 2,621,187), 4-methoxy-1-methyl-tryptophan (J. Chem. Soc., 1952, 3904) and 5,6-dimethoxytryptophan [J. Am. Chem. Soc., 75, 5887 (1953)], there are obtained the ethylene glycol ketals of 3-acetamido - 4 - (6 - methoxy-3-indolyl)-2-butanone, 3-acetamido-4-(4-methoxy -1- methyl - 3 - indolyl) - 2 - butanone, and 3-acetamido-4-(5,6-dimethoxy-3-indolyl)-2-butanone, respectively. The latter compounds are then hydrolyzed to give the ethylene glycol ketals of 3-amino-4-(6-methoxy-3-indolyl)-2-butanone, 3-amino-4-(4-methoxy-1-methyl-3-indolyl)-2-butanone, and 3-amino-4-(5,6-dimethoxy-3-indolyl)-2-butanone, respectively.

We claim:
1. A compound selected from the class consisting of (a) the free base form and (b) the pharmacologically acceptable acid addition salts of compounds having the formula:

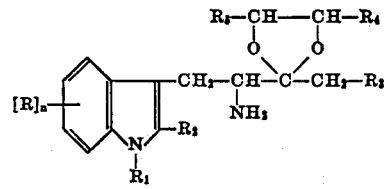

wherein R is selected from the class consisting of hydroxy, halogen, alkyl from 1 to 6 carbon atoms, inclusive, aralkyl from 7 to 13 carbon atoms, inclusive, alkoxy from 1 to 6 carbon atoms, inclusive, and aralkoxy from 7 to 13 carbon atoms, inclusive, n is an integer from zero to 4, inclusive, $R_1$ and $R_2$ are selected from the class consisting of hydrogen, alkyl from 1 to 6 carbon atoms, inclusive, and aralkyl from 7 to 13 carbon atoms, inclusive, $R_3$ and $R_4$ are selected from the class consisting of hydrogen and alkyl from 1 to 6 carbon atoms, inclusive, and $R_5$ is selected from the class consisting of hydrogen, alkyl from 1 to 6 carbon atoms, inclusive, and methylol.

2. The ethylene glycol ketal of 3-amino-4-(3-indolyl)-2-butanone.

3. The ethylene glycol ketal of 2-amino-1-(3-indolyl)-3-pentanone.

4. The ethylene glycol ketal of 3-amino-4-(5-methyl-3-indolyl)-2-butanone.

5. The ethylene glycol ketal of 3-amino-4-(5-benzyloxy-3-indolyl)-2-butanone.

6. The acetate of the 1,2-dimethylethylene glycol ketal of 3-amino-4-(3-indolyl)-2-butanone.

7. The glycerol ketal of 3-amino-4-(3-indolyl)-2-butanone.

8. A compound selected from the class consisting of compounds having the formula:

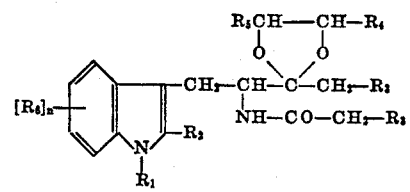

wherein $R_1$ and $R_2$ are selected from the class consisting of hydrogen, alkyl from 1 to 6 carbon atoms, inclusive, and aralkyl from 7 to 13 carbon atoms, inclusive, $R_3$ and $R_4$ are selected from the class consisting of hydrogen and alkyl from 1 to 6 carbon atoms, inclusive, $R_5$ is selected from the class consisting of hydrogen, alkyl from 1 to 6 carbon atoms, inclusive, and methylol, $R_6$ is selected from the class consisting of halogen, alkyl from 1 to 6 carbon atoms, inclusive, aralkyl from 7 to 13 carbon atoms, inclusive, alkoxy from 1 to 6 carbon atoms, inclusive, and aralkoxy from 7 to 13 carbon atoms, inclusive, and n is an integer from zero to 4, inclusive.

9. The glycerol ketal of 3-acetamido-4-(3-indolyl)-2-butanone.

10. The ethylene glycol ketal of 3-acetamido-4-(3-indolyl)-2-butanone.

11. The ethylene glycol ketal of 2-propionamido-1-(3-indolyl)-3-pentanone.

12. The ethylene glycol ketal of 3-acetamido-4-(5-methyl-3-indolyl)-2-butanone.

13. The ethylene glycol ketal of 3-acetamido-4-(5-benzyloxy-3-indolyl)-2-butanone.

14. The 1,2-dimethylethylene glycol ketal of 3-acetamido-4-(3-indolyl)-2-butanone.

15. A process for the preparation of a compound having the formula:

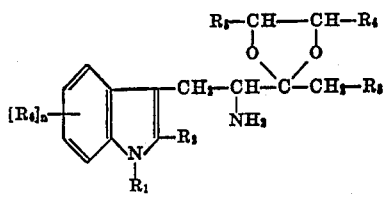

wherein $R_1$ and $R_2$ are selected from the class consisting of hydrogen, alkyl from 1 to 6 carbon atoms, inclusive, and aralkyl from 7 to 13 carbon atoms, inclusive, $R_3$ and $R_4$ are selected from the class consisting of hydrogen and alkyl from 1 to 6 carbon atoms, inclusive, $R_5$ is selected from the class consisting of hydrogen, alkyl from 1 to 6 carbon atoms, inclusive, and methylol, $R_6$ is selected from the class consisting of halogen, alkyl from 1 to 6 carbon atoms, inclusive, aralkyl from 7 to 13 carbon atoms, inclusive, alkoxy from 1 to 6 carbon atoms, inclusive, aralkoxy from 7 to 13 carbon atoms, inclusive, and $n$ is an integer from zero to 4, inclusive, which comprises treating a tryptophan having the formula:

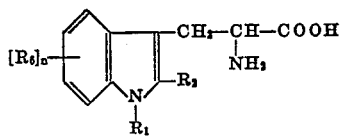

wherein $R_1$, $R_2$, $R_6$ and $n$ have the significance hereinbefore defined with an acid anhydride having the formula $(R_3CH_2CO)_2O$ wherein $R_3$ has the significance hereinbefore defined, in the presence of a tertiary amine to obtain a ketone having the formula:

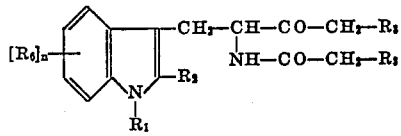

wherein $R_1$, $R_2$, $R_3$, $R_6$ and $n$ have the significance hereinbefore defined, ketalizing the latter compound with a glycol having the formula

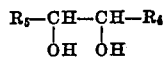

wherein $R_4$ and $R_5$ have the significance hereinbefore defined in the presence of an acid medium to form a compound having the formula:

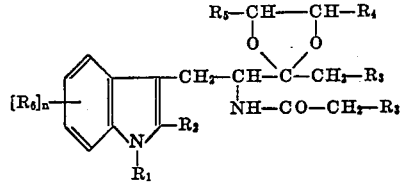

wherein $R_1$, $R_2$, $R_3$, $R_4$, $R_5$, $R_6$ and $n$ have the significance hereinbefore defined, and hydrolyzing the compound so obtained to give the desired compound.

16. The process of claim 15 wherein the ketalization is effected by refluxing the ketone and the glycol in the presence of benzene and a catalytic quantity of p-toluenesulfonic acid.

17. A process for the preparation of a compound having the formula:

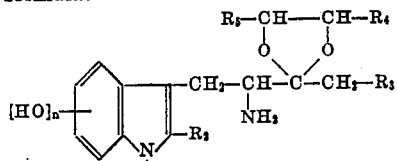

wherein $R_1$ and $R_2$ are selected from the class consisting of hydrogen, alkyl from 1 to 6 carbon atoms, inclusive, and aralkyl from 7 to 13 carbon atoms, inclusive, $R_3$ and $R_4$ are selected from the class consisting of hydrogen and alkyl from 1 to 6 carbon atoms, inclusive, $R_5$ is selected from the class consisting of hydrogen, alkyl from 1 to 6 carbon atoms, inclusive, and methylol, and $n$ is an integer from zero to 4, inclusive, which comprises treating a tryptophan having the formula:

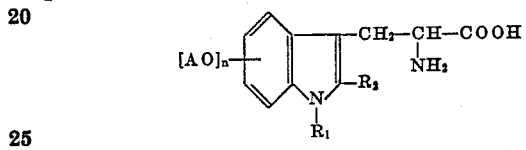

wherein A represents aralkyl from 7 to 13 carbon atoms, inclusive, and $R_1$, $R_2$ and $n$ have the significance hereinbefore defined with an acid anhydride having the formula $(R_3CH_2CO)_2O$ wherein $R_3$ has the significance hereinbefore defined, in the presence of a tertiary amine to obtain a ketone having the formula:

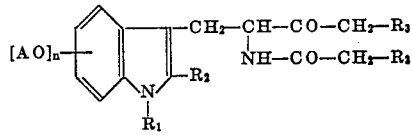

wherein A, $R_1$, $R_2$, $R_3$ and $n$ have the significance hereinbefore defined, ketalizing the latter compound with a glycol having the formula

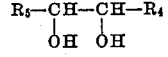

in the presence of an acid medium, to form a compound having the formula:

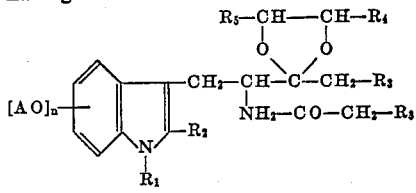

wherein A, $R_1$, $R_2$, $R_3$, $R_4$, $R_5$ and $n$ have the significance hereinbefore defined, and subjecting the latter compound to hydrolysis to produce the corresponding free amine and subjecting the amine so obtained to hydrogenolysis to remove the group A and yield the desired compound.

18. The process of claim 17 wherein the ketalization is effected by refluxing the ketone and the glycol in the presence of benzene and a catalytic quantity of p-toluenesulfonic acid.

References Cited in the file of this patent

Ghosh et al.: Chemical Abstracts, pp. 1141–1142, vol. 51 (1957), citing J. Indian Chem. Society, vol. 33, pp. 296–298 (1956).